(12) United States Patent
Allos

(10) Patent No.: US 7,912,751 B1
(45) Date of Patent: Mar. 22, 2011

(54) SYSTEM AND METHOD FOR CUSTOMER LOYALTY SYSTEM UTILIZING REFERRALS

(76) Inventor: Haytham Issa Allos, San Diego, CA (US)

( * ) Notice: Subject to any disclaimer, the term of this patent is extended or adjusted under 35 U.S.C. 154(b) by 802 days.

(21) Appl. No.: 11/895,848

(22) Filed: Aug. 27, 2007

(51) Int. Cl.
*G06Q 10/00* (2006.01)
*G06Q 30/00* (2006.01)

(52) U.S. Cl. ............ 705/14.16; 705/1.1; 705/14.1

(58) Field of Classification Search .......... 705/1.1, 705/14.1, 14.16
See application file for complete search history.

(56) References Cited

U.S. PATENT DOCUMENTS

| | | |
|---|---|---|
| 5,923,016 A | 7/1999 | Fredregill et al. |
| 6,061,660 A | 5/2000 | Eggleston et al. |
| 6,070,147 A | 5/2000 | Harms et al. |
| 6,119,933 A | 9/2000 | Wong et al. |
| 6,138,911 A | 10/2000 | Fredregill et al. |
| 6,266,647 B1 | 7/2001 | Fernandez |
| 6,327,573 B1 | 12/2001 | Walker et al. |
| 6,415,261 B1 | 7/2002 | Cybul et al. |
| 6,516,302 B1 | 2/2003 | Deaton et al. |
| 6,611,811 B1 | 8/2003 | Deaton et al. |
| 6,687,679 B1 | 2/2004 | Van Luchene et al. |
| 6,697,785 B2 | 2/2004 | Dixon, III et al. |
| 6,901,375 B2 | 5/2005 | Fernandez |
| 6,915,270 B1 | 7/2005 | Young et al. |
| 7,076,444 B1 | 7/2006 | Baron et al. |
| 7,086,584 B2 | 8/2006 | Stoutenburg et al. |
| 7,156,303 B1 | 1/2007 | Holzman |
| 7,188,089 B2 | 3/2007 | Goldthwaite et al. |
| 7,188,110 B1 | 3/2007 | Ludtke et al. |
| 7,194,423 B2 | 3/2007 | Walker et al. |
| 2001/0020231 A1* | 9/2001 | Perri et al. ............... 705/14 |
| 2002/0082920 A1 | 6/2002 | Austin et al. |
| 2002/0120514 A1 | 8/2002 | Hagmeier et al. |
| 2003/0158818 A1 | 8/2003 | George et al. |
| 2003/0191709 A1 | 10/2003 | Elston et al. |
| 2003/0208403 A1 | 11/2003 | Fisher et al. |
| 2004/0186773 A1 | 9/2004 | George et al. |
| 2005/0279830 A1* | 12/2005 | Chao ............... 235/380 |
| 2006/0224450 A1 | 10/2006 | Moon |
| 2006/0230104 A1 | 10/2006 | Winter |
| 2006/0242087 A1 | 10/2006 | Naehr et al. |
| 2007/0022007 A1 | 1/2007 | Lawe |
| 2007/0112632 A1 | 5/2007 | Voltmer et al. |
| 2007/0267487 A1* | 11/2007 | Chao ............... 235/380 |

* cited by examiner

*Primary Examiner* — Jonathan Ouellette

(57) ABSTRACT

A system and method for a customer loyalty system utilizing referrals to generate a network of loyal customers for a business. A system and method for customers to join a customer loyalty program based on a multi-level marketing (MLM) referral program. Existing customers will receive incentives for purchases and addition incentives for referring new customers. Loyalty system customers will earn incentives every time someone within their referral network completes a purchase. Moreover, the present invention is adapted to improve the merchant's customer relationships, adapted to building referral networks by utilizing indirect referral incentives, and easily integrates with the existing point of sale system of a business.

21 Claims, 9 Drawing Sheets

" Prior Art "

" Prior Art"

" Prior Art "

SYSTEM AND METHOD FOR CUSTOMER LOYALTY SYSTEM UTILIZING REFERRALS

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of the Invention

This invention relates to field of retail customer loyalty systems.

2. Prior Art

Customer loyalty systems are typically operated by merchants to aid in increasing business and improving customer relationships. As expected, customer loyalty systems have improved over the years. An example of a prior art customer loyalty system traditionally enrolls customers into a customer loyalty program and customers earned incentives (i.e. points, discounts, miles, etc) for purchases made using the customer loyalty program. When customers accumulate incentives (i.e. points, discounts, miles, etc) they typically redeemed them for rewards. The disadvantages with this type of loyalty system are that customers may only earn incentives when they themselves made a purchase.

To overcome the disadvantages of the previously described loyalty system, a new referral based loyalty system was developed and utilized by a variety of different industries. The referral based loyalty system promised customers the ability to earn additional incentives for referring new customers. The main focus of the referral based loyalty systems was to award existing customers for enrolling new customers into the loyalty system. The loyalty system customers were still given incentives (i.e. points, miles, discounts) for purchases as before and were promised an incentive (i.e. points, miles, discounts) for referring new customers. However, disadvantages still overwhelmed this type of referral based loyalty system. Customers typically became unmotivated to refer new business and many customers did not want to refer friends and family in return of a very small incentive to be earned.

To overcome the disadvantages of the previously described referral based loyalty system, an improved incentive referral based loyalty system was developed and utilized by a variety of different industries. The improved referral based loyalty system promised customers the ability to earn additional incentives for referring new customers, and promised to provide a bonus incentive to new customers if they were referred by existing customers. The main focus of the improved referral based loyalty system was to award existing customers for enrolling new customers into the loyalty system and to also provide an motivation to the existing customer to refer a friend or relative by enticing them with a generous incentive bonus that the new member would also earn for becoming a member. Customers were appreciative for earning incentives and rewards for referring new customers to the loyalty system, and were also appreciative that their referral also benefited from becoming a member. In spite these improvements; disadvantages still trouble this type of improved referral based loyalty system, customers were unenthusiastic for only receiving incentives for direct referrals.

A need therefore exists for a superior customer loyalty system designed to motivate existing customers into referring new business to a merchant.

SUMMARY

The present invention relates to an improved referral based customer loyalty system and method adapted to improve the merchant's customer relationships, also adapted to building referral networks by utilizing indirect referral incentives, and easily integrates with the existing merchant point of sale system.

Moreover, the invention relates to a customer loyalty system and method that may be utilized by a variety of different industries, in example, restaurants, gasoline service stations, convenience stores, franchises, banking, hotel, cleaners, and car wash detail shops. The present invention is adapted to integrate into a small, medium or large size business.

An exemplary embodiment of the present invention relates to a method of utilizing customer referral procedures to create customer loyalty for a plurality of businesses. The method comprises, enrolling a customer into a loyalty system by creating a customer profile in the loyalty system, activating a unique customer identifier associated to the customer for use to interact with the loyalty system, activating at least one unique referral identifiers associated with the customer, allowing the customer to create the unique referral identifier associated with said customer profile, and establishing an incentive for referring new customers. Incentives are rewarded for direct and indirect referrals. The incentive value may be modifiable and may be set at different values depending on the referral level value associated with the customer within the referral network. Moreover, a loyalty system customer may be assigned a plurality of referral identifiers, wherein a referral identifier may be an email address, a radio frequency identifier (RFID), a barcode value, or an alpha-numeric identifier. Also, the unique customer identifier may be an email address, a radio frequency identifier (RFID), a barcode value, or an alpha-numeric identifier.

An exemplary embodiment of the present invention relates to a method of building customer credit. The method comprises, enrolling a customer into a loyalty system, assigning the customer an incentive value set by a business, providing the customer with at least one referral identifier to distribute to a new customer with the agreement of receiving an additional incentive if the referral patronizes the business and also enrolls into the loyalty system. Moreover, the method further comprises providing an incentive for the customer to establish a referral network.

An exemplary embodiment of the present invention relates to a method for building credit. The method comprises, the use of a loyalty system to store data, defining a multi-level referral incentive logic for the loyalty system, assigning at least one level value in the loyalty system and appointing at least one incentive value in the loyalty system to correspond with the level value in the loyalty system. The present invention relates to a customer loyalty program based on a multi-level marketing (MLM) referral program. The multi-level referral incentive logic is used to establish the incentive for loyalty system customers and also define the number of levels currently supported by the loyalty system. For example, the multi-level referral incentive logic may equal 5%, 4%, 3%, 2%, 1% wherein 5% is equal to the level 1 (customer A) incentive awarded to customer A, 4% is equal to the level 2

(direct referral of customer A) incentive awarded to customer A for purchases made by his/her direct referral, 3% is associated with level 3 earning customer A 3% for every purchase made by the referral of direct referral of customer A, 2% is associated with level 4 nodes, and finally, 1% is associated with the level 5 incentive awarded to customer A of the loyalty system. In other words, loyalty system customers will earn incentives every time someone within their referral network completes a purchase. The multi-level referral incentive logic may be modifiable by the merchant. Equally important, the loyalty system may have a default value or may be adjustable from one to an infinite number of level values, as allowable by the computer hardware. Also, the level value in the loyalty system may be set as a default or may be adjusted by the merchant.

An exemplary embodiment of the present invention relates to a system for building credit. The loyalty client application may utilize a multi-level referral incentive logic. Also, the loyalty client application may set a level value and an incentive value. Moreover, the loyalty client application may be in communication with a point of sale system or may be used as a stand alone application for tracking loyalty system customers. The system may comprise a database server or may store transaction data within a memory medium as supported by the standalone computer hardware. The system may comprise a processor for processing means and storage means for storing data on a storage medium. The system may comprise an application server. Also, the loyalty system may be implemented as a multi-tier architecture application (in example, client-server application), as a web enabled application, or as a stand alone program. The loyalty system may be in communication the point of sale system. The loyalty system may integrate with the business existing point of sale system or may intercept transactions directed to the printer to capture customer transaction data. Moreover, the loyalty system client application may be in communication with the point of sale system or may intercept transactions directed to the printer. The connection between a point of sale system and a loyalty system may be a wired serial, wired parallel or wireless interface connection.

An exemplary embodiment of the present invention relates to a method for operating a customer loyalty system. The method comprising, utilizing a loyalty system client with at least one customer profile, accepting a point of sale system output directed to the loyalty system client, credits the at least one customer profile with a system defined incentive value and link at least one referral identifier to the at least one customer profile. The loyalty system client application may be a thin-client application or a thick-client application.

An exemplary embodiment of the present invention relates to a customer resource management system with the ability to store customer data and provide real-time, itemized, and geographical consumer purchasing data for businesses. Merchants are able to reach their customers utilizing electronic mail and query their purchase behavior. Merchants are able to gain valuable reports about their customers and their respective purchasing habits. The customer relations management system may be a standalone, a thin client or a web enabled application that is platform independent for use by merchants to review customer data and by customers to review their earned incentive data and to print referral identifier used to refer new customers.

The customer loyalty system may be implemented utilizing the .NET framework, in particularly using C# programming language, or other object oriented programming languages, such as java. The customer loyalty system may utilize web services in its implementation. The customer loyalty system may standardize legacy point of sale system data by utilizing extensible markup language.

The customer loyalty system may allow a merchant the ability to reward bonus incentives to customers of the customer loyalty system. Also, the customer loyalty system may allow a merchant the ability to redeem incentives earned by customers.

DRAWINGS

DETAILED DESCRIPTION

Reference is now made to the drawings wherein like numerals refer to like parts throughout.

As used herein, the term "virtual credit" refers to the ability to earn credit through indirect referrals.

As used herein, the term "direct referral" refers to an occurrence when a customer finds a new customer to give referral. The relationship between the one who gave the referral and the one who received the referral is immediate with no other person in between.

As used herein, the term "indirect referral" refers to an occurrence when a referred customer, referred by original customer, finds a new customer to refer. The relationship between the original referrer and the new referred customer is not immediate with one or more people between.

As used herein the term "incentive" refers to rewards earned by loyalty system customers, in example, points, credits, bonuses, miles, cash discounts, etc.

As used herein, the term "referral network" refers to all the referrals, both direct referrals and/or indirect referrals, linked or associated to a specific customer. Also, in relation to defining a referral network within a loyalty system, referral network can be interpreted to reflect the logic set by the merchant in relations to the number of levels defined and the respective incentive at each level.

As used herein, the term "thin client application" refers to a client computer or client software in client-server architecture networks which depends primarily on the central server for processing activities, and mainly focuses on conveying input and output between the user and the remote server.

As used herein, the term "database" refers to a structured collection of records or data that is stored in a computer so that a computer program can consult it to answer queries.

As used herein, the term "database server" refers to a computer program that provides database services to other computer programs or computers, as defined by the client-server model. The term may also refer to a computer dedicated to running such a program.

As used herein, the term "application server" refers to a software engine that delivers applications to client computers or devices. Moreover, an application server handles most, if not all, of the business logic and data access of the application (a.k.a. centralization).

In general, the present invention describes a multi-level referral based loyalty system and method.

Figure 1:
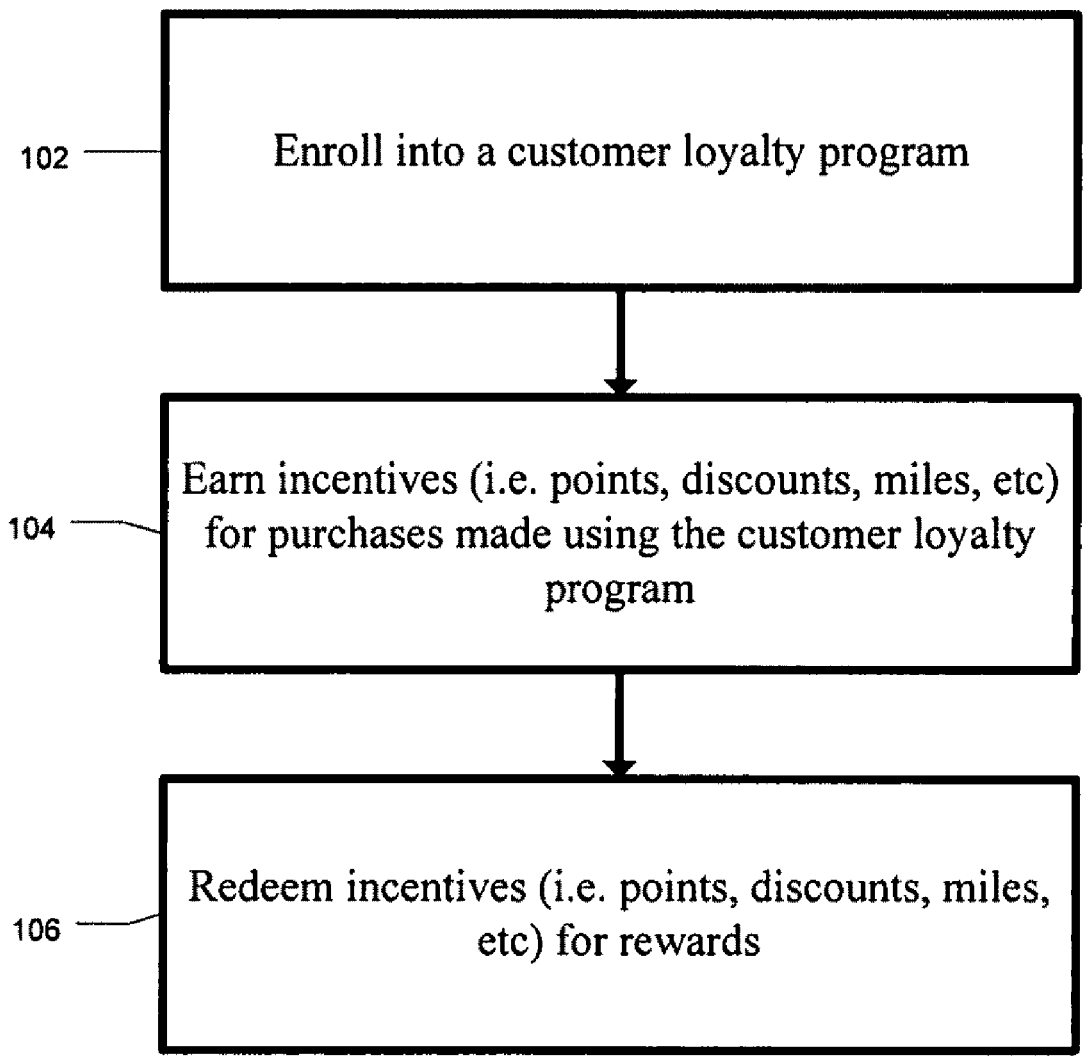
FIG. 1 is a flow diagram of a prior art loyalty system designed to reward customers for purchases.

An example of a prior art loyalty system is shown in FIG. 1. Traditionally, a prior art loyalty system enrolls a customers into a customer loyalty program 102 and customers earn incentives (i.e. points, discounts, miles, etc) for purchases made using the customer loyalty program 104. When incentives are met, customers redeem incentives (i.e. points, discounts, miles, etc) for rewards 106.

Figure 2:
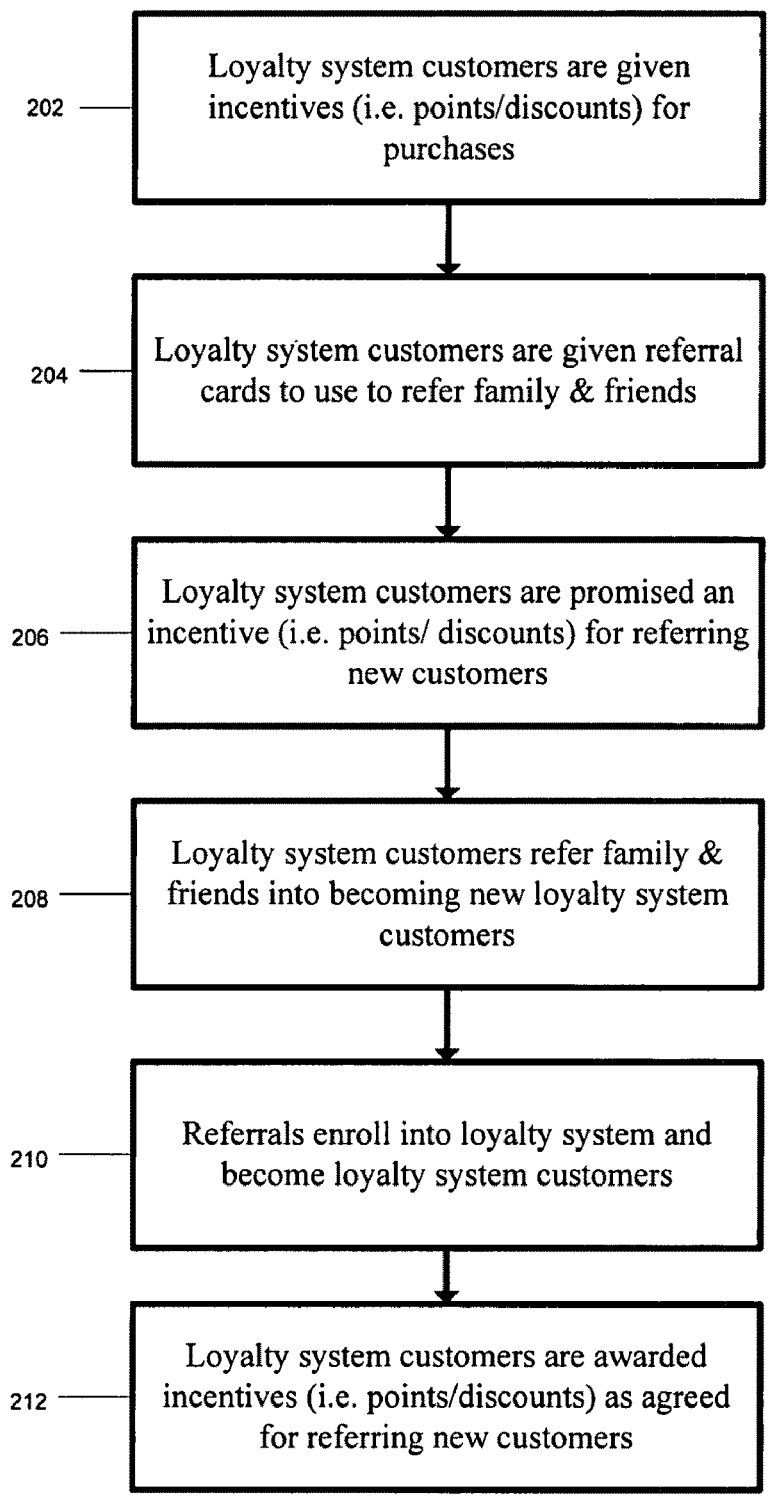
FIG. 2 is a flow diagram of a prior art loyalty system designed to reward customers for purchases and referrals.

An example of a prior art loyalty system is shown in FIG. 2. Customarily, a prior art referral based loyalty system is designed to award existing customers for enrolling new customers into the loyalty system. As described in FIG. 2, the loyalty system customers are given incentives (i.e. points/discounts) for purchases 202, loyalty system customers are given referral cards to use to refer family & friends 204, and most importantly, loyalty system customers are promised an incentive (i.e. points/discounts) for referring new customers 206. Then, loyalty system customers refer family & friends into becoming new loyalty system customers 208, their respective referrals enroll into loyalty system and become new loyalty system customers 210, and loyalty system customers are awarded incentives (i.e. points, discounts, etc.) as agreed for referring new customers 212.

Figure 3:
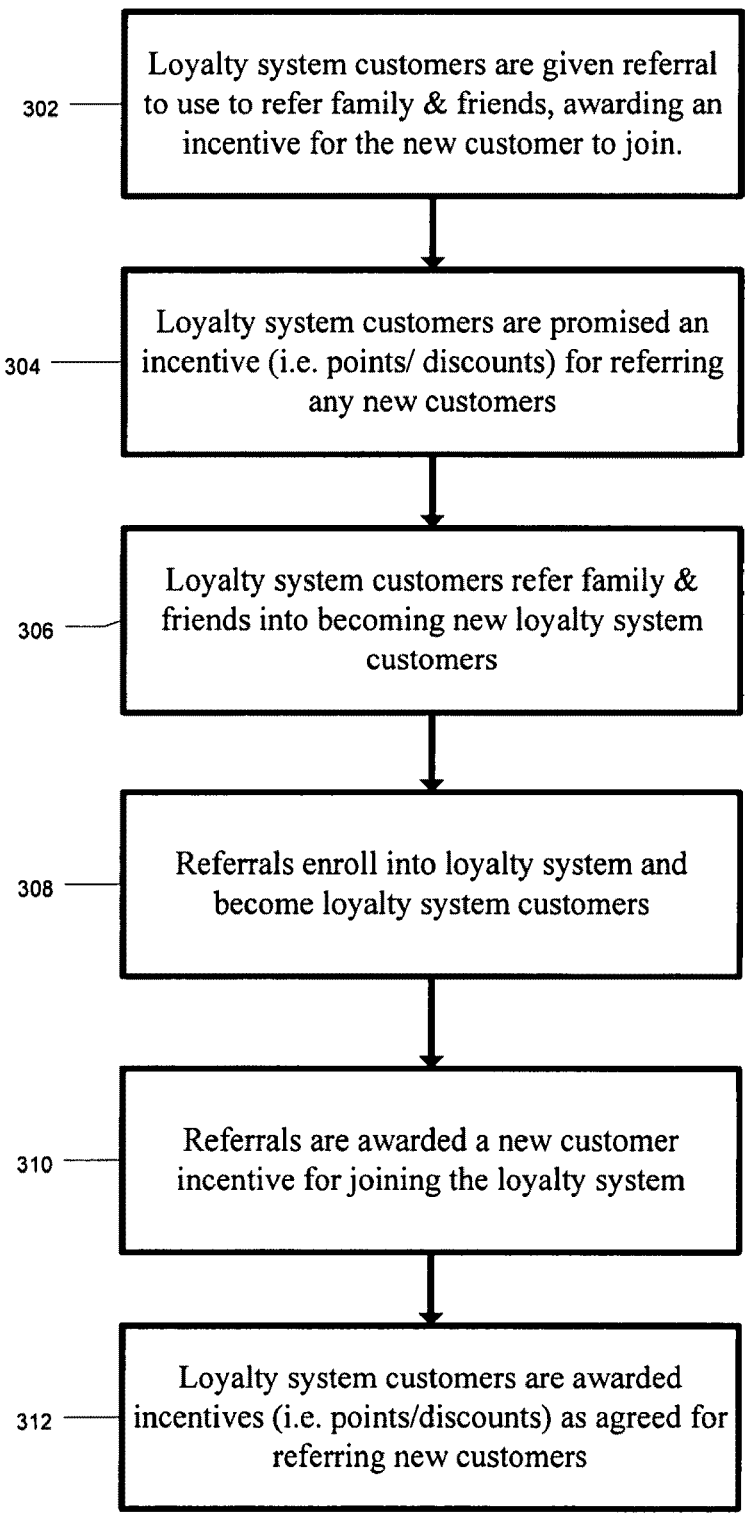
FIG. 3 is a flow diagram of a prior art loyalty system designed to reward existing customers for referring new customers to the system and reward referrals for enrolling.

An example of a prior art loyalty system is described in FIG. 3. Usually, a prior art incentive based referral loyalty system is designed to award both the existing customer and the new customer for referring a business to a new consumer. As described in FIG. 3, loyalty system customers are given referral to use to refer family & friends, awarding an incentive for the new customer to join 302 and loyalty system customers are promised an incentive (i.e. points/discounts) for referring any new customers 304. Then, loyalty system customers refer family & friends into becoming new loyalty system customers 306, referrals enroll into loyalty system and become loyalty system customers 308. Furthermore, referrals are awarded a new customer incentive for joining the loyalty system 310 and also loyalty system customers are awarded incentives (i.e. points, discounts, etc.) as agreed for referring new customers 312.

Figure 4:
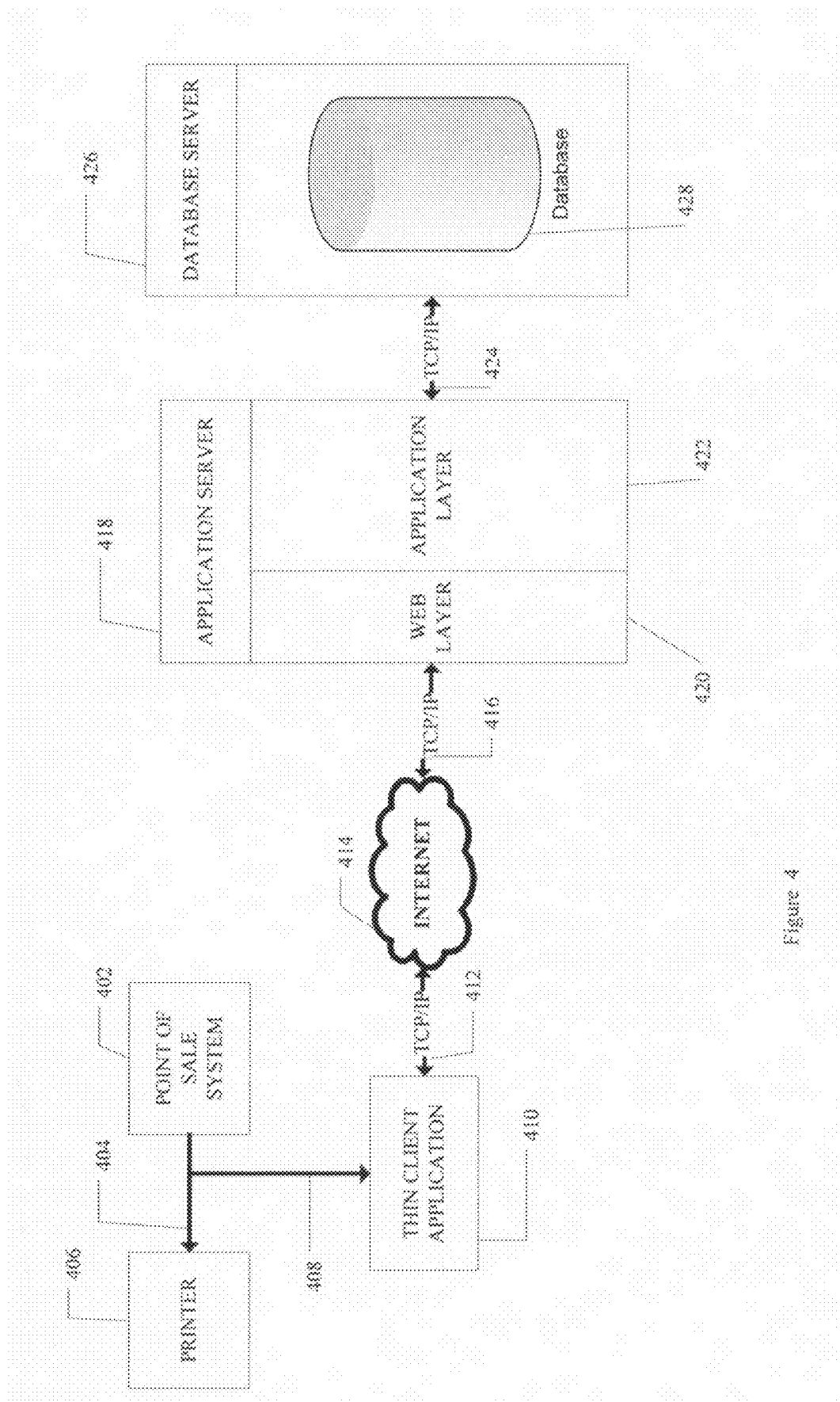
FIG. 4 is an architectural diagram illustration an exemplary configuration according to this invention.

FIG. 4 illustrating an architectural diagram of a single merchant loyalty system, utilizing a central server architectural. The point of sale system 402 captures the customer transaction and communicates by means of a communication medium 404 with the external printer 406 to provide a customer with a receipt. The thin client application 410 intercepts communication 408 intended for the external printer 406 and send the customer transaction data to the thin client application 410. The thin client application 410 communicates the customer transaction by means of TCP/IP communication link 412 to the internet 414. The internet 414 also communicates the customer transaction by mean of TCP/IP communication link 416 to the respective application server 418 for processing. The application server 418 comprises the web layer 420 and the application layer 422. The web layer 420 comprises a set of web services and defines business functions. The application layer 422 provides semantic conversion between associated application processes. The application server 418 communicates by means of TCP/IP 424 to the database server 426. The database server 426 comprises the database 428 to store transaction data. The database server 426 sends a response by means of TCP/IP link 424 to the application server 418, which in turn sends a response by means of TCP/IP 416 through the internet 414. The response travels through the internet 414 and the response travels by the use of TCP/IP 412 to the thin client application 410 to confirm the receipt of transactions previously sent to the database server 426 for storage of transaction data.

Figure 5:
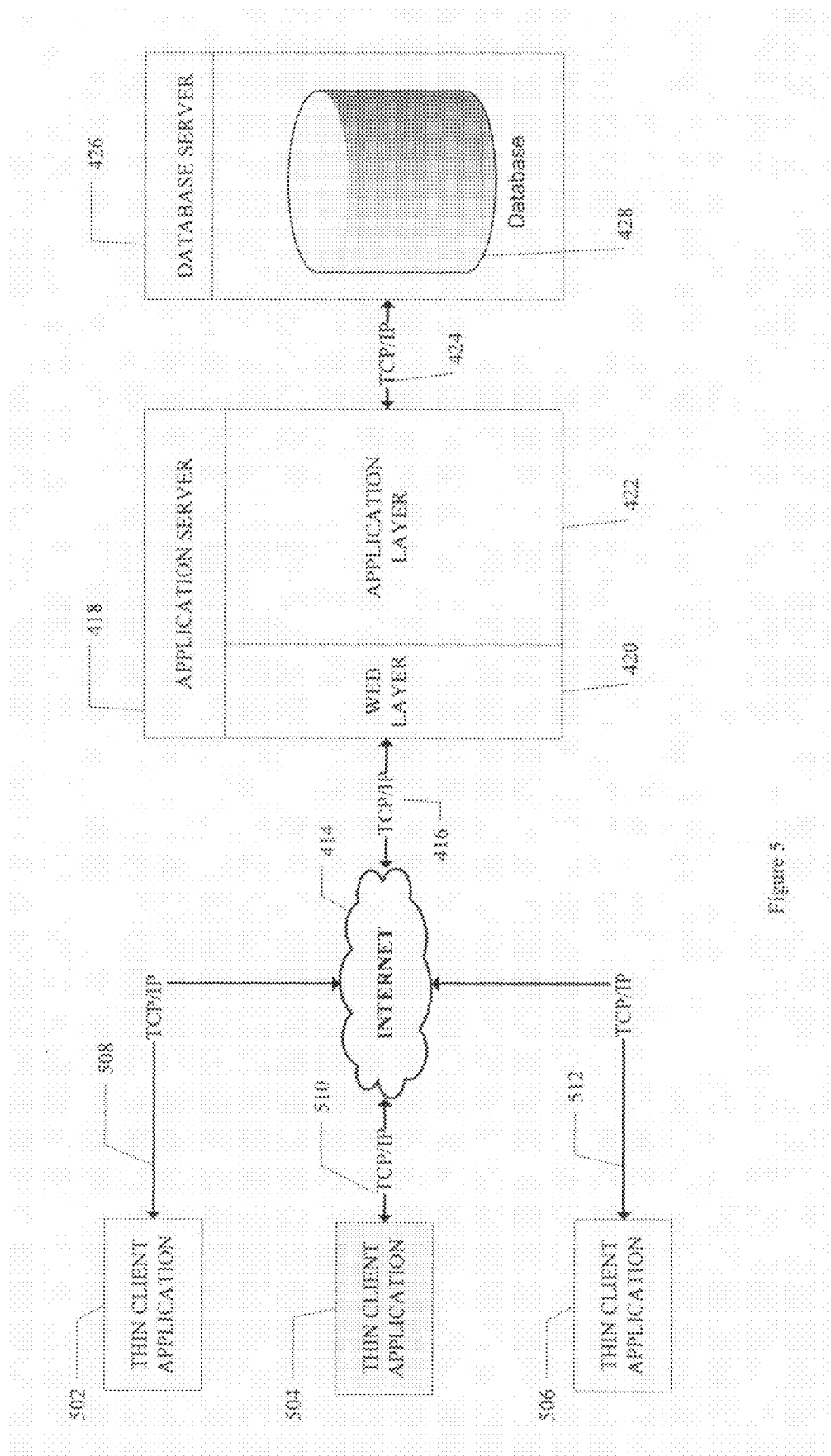
FIG. 5 is an architectural diagram illustrating an alternative exemplary configuration according to this invention.

FIG. 5 illustrates a multi-merchant loyalty system, wherein utilizing a central server architectural. Multiple thin client applications 502/04/506 communicate by means of TCP/IP connection means 508/510/512 to the internet 414 to facilitate a response from the database 428. The internet 414 communicates the customer transaction by mean of TCP/IP communication link 416 to the respective application server 418 for processing. The application server 418 comprises the web layer 420 and the application layer 422. The web layer 420 comprises a set of web services and defines business functions. The application layer 422 provides semantic conversion between associated application processes. The application server 418 communicates by means of TCP/IP 424 to the database server 426. The database server 426 comprises the database 428 to store transactions data. The database server 426 sends a response by means of TCP/IP link 424 to the application server 418, which in turn sends a response by means of TCP/IP 416 through the internet 414. The response travels through the internet 414 and the response travels by the use of TCP/IP 412 to the thin client application 410 to confirm the receipt of transactions previously sent to the database server 426 for storage of transaction data.

Figure 6:
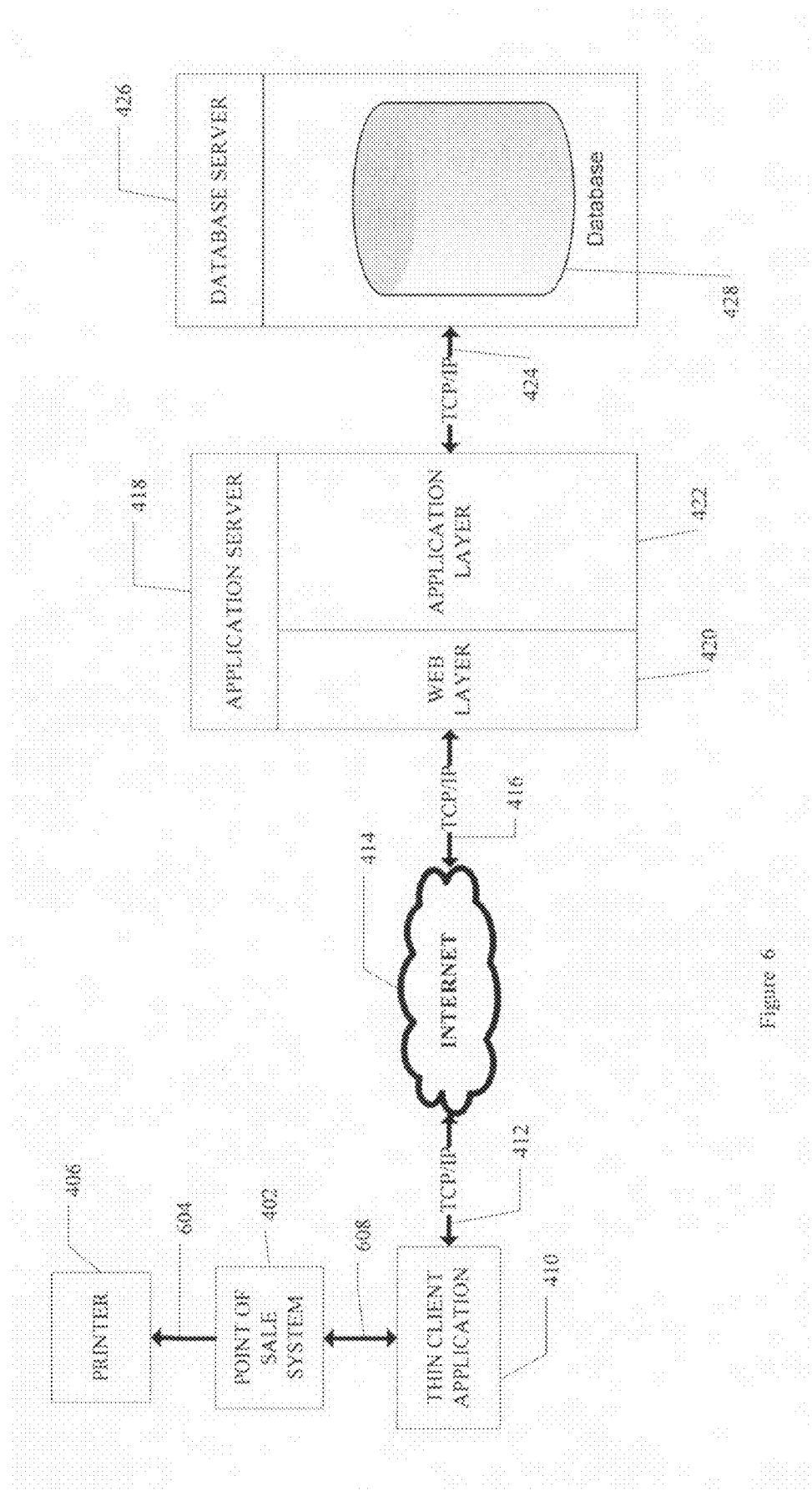
FIG. 6 is an architectural diagram illustrating another exemplary configuration according to this invention.

FIG. 6 illustrates a loyalty system utilizing an n-tiered architecture wherein the point of sale system 402 interacts directly by means of a communication medium 608 with the thin client application 410. In addition, the point of sale system 402 also interacts externally by means of a communication medium 604 with the printer 406. The thin client application 410 communicates by means of TCP/IP communication link 412 to the internet 414. The internet 414 also communicates the customer transaction by mean of TCP/IP communication link 416 to the respective application server 418 for processing. The application server 418 comprises the web layer 420 and the application layer 422. The web layer 420 comprises a set of web services and defines business functions. The application layer 422 provides semantic conversion between associated application processes. The application server 418 communicates by means of TCP/IP 424 to the database server 426. The database server 426 comprises the database 428 to store transaction data. The database server 426 sends a response by means of TCP/IP link 424 to the application server 418, which in turn sends a response by means of TCP/IP 416 through the internet 414. The response travels through the internet 414 and the response travels by the use of TCP/IP 412 to the thin client application 410 to confirm the receipt of transactions previously sent to the database server 426 for storage of transaction data.

Figure 7:
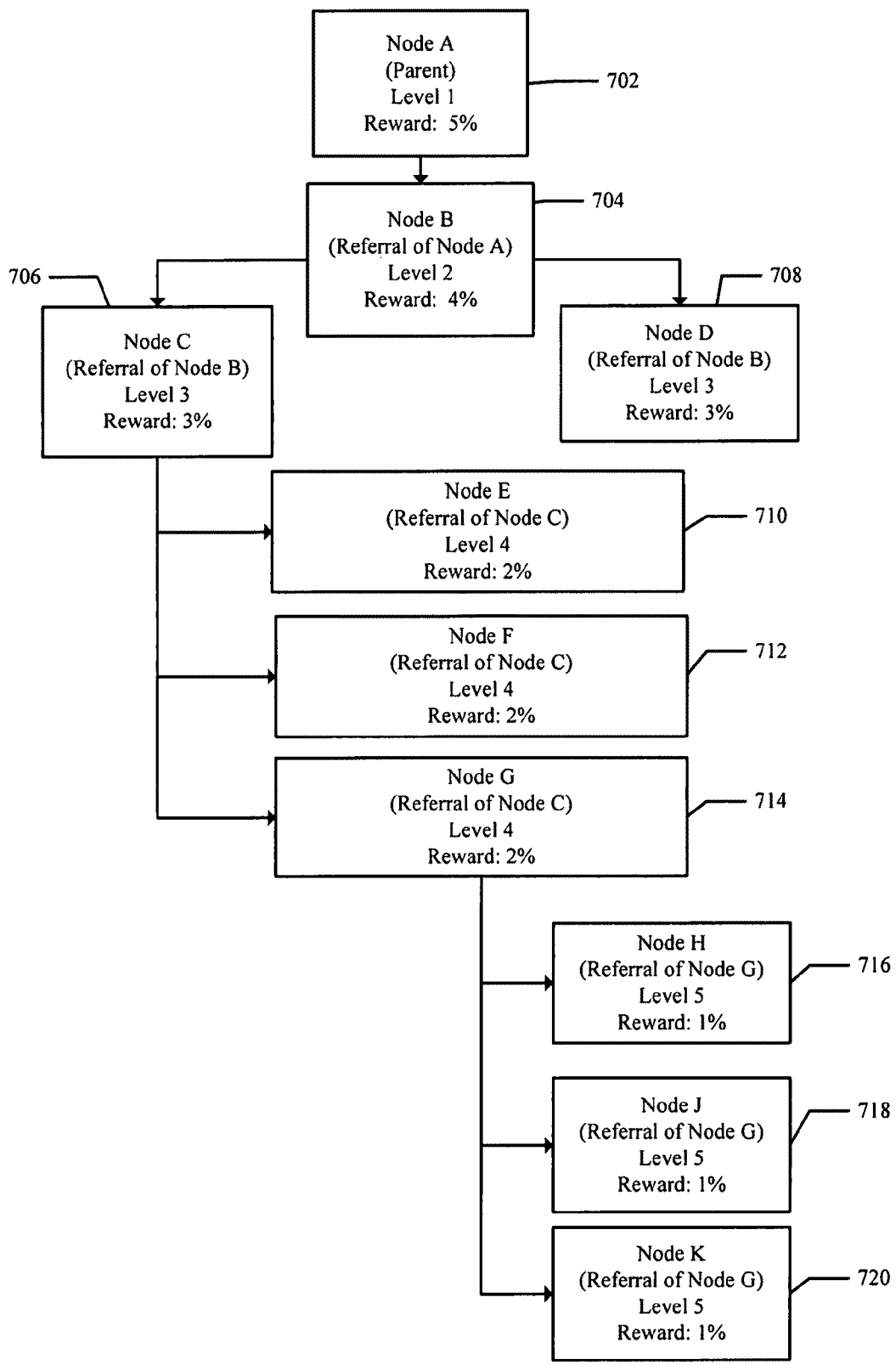
FIG. 7 is a diagram illustrating an exemplary embodiment of the multi-level referral based loyalty system according to this invention.

An exemplary embodiment of the multi-level referral based loyalty system is illustrated in FIG. 7. The invention describes a multi-level referral based loyalty system wherein incentives are promoted to current customers to lead to the referrals of new business to the merchant place of business. Current customers earn incentives, wherein incentives may be points, miles, prizes, rebate, discount, etc. based on their eligible purchases and on eligible purchases of referral business earned within their referral network. A loyalty system customer may establish a referral network, wherein his direct referrals are linked to his account profile. Direct referrals may also refer others to the business. This process of earning credit by indirect referral is an exemplary aspect of this invention. As FIG. 7 describes "Node A" 702 at level 1 refers "Node B" 704 assigned to level 2 due to a direct link to "Node A" 702. As described in this diagram, "Node A" 702 earns a 5% reward for eligible purchase made by "Node A" 702 and a 4% reward for eligible purchases made by "Node B" 704. When "Node B" 704 refers both "Node C" 706 and "Node D" 708 thereby creating a level 3 as associated with "Node A" 702. Whereby, "Node A" 702 earns a 3% reward for eligible purchases made by "Node C" 706 and/or "Node D" 708 due to their network referral relationship, earning "Node A" 702 virtual credit. Credit earned from indirect referrals such is the example case between "Node A" 702 and "Node C" 706 are sometimes referred to as virtual credit. When "Node C" 706 refers "Node E" 710, "Node F" 712, and "Node G" 714 thereby creating a level 4 association with "Node A" 702. Whereby, "Node A" 702 earns a 2% reward for eligible purchases made by "Node E" 710, "Node F" 712, and/or "Node G" 714 due to their network referral relationship, earning "Node A" 702 virtual credit. When "Node G" 714 refers "Node H" 716, "Node J" 718, and "Node K" 720 thereby creating a level 5 as associate with "Node A" 702. Whereby, "Node A" 702 earns a 1% reward for eligible purchases made by "Node H" 716, "Node J" 718, and/or "Node K" 720 due to their network referral relationship, earning "Node A" 702 virtual credit.

Figure 8:
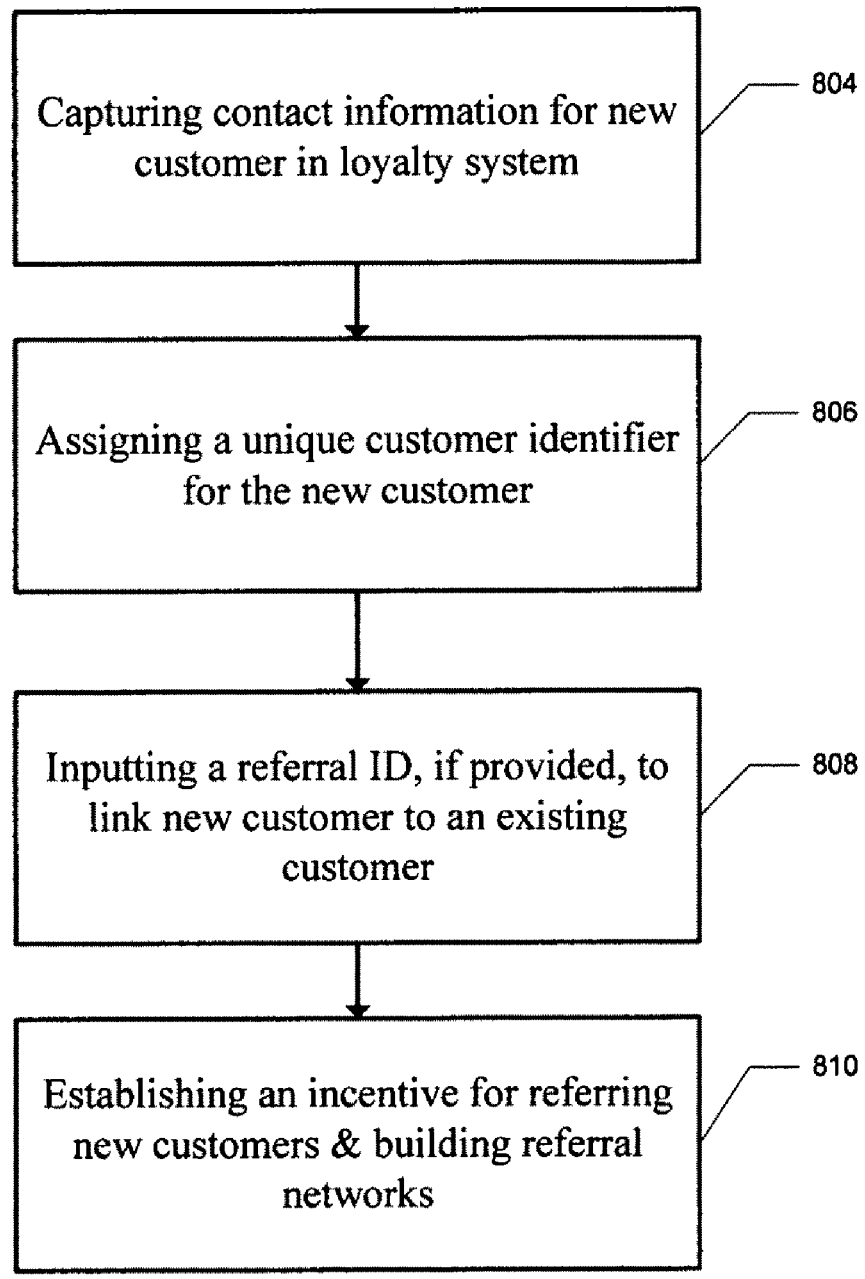
FIG. 8 is a flow diagram describing an exemplary method of the present invention.

An exemplary method of the multi-level referral based loyalty system is described in FIG. 8. The method begins by capturing contact information for new customer 804 into the loyalty system. Also, assigning a unique customer identifier for the new customer 806 used to refer new customers and inputting a referral ID, if provided, to link new customer to an existing customer 808. Finally, the method concludes by establishing an incentive for referring new customers and building referral networks 810.

Figure 9:
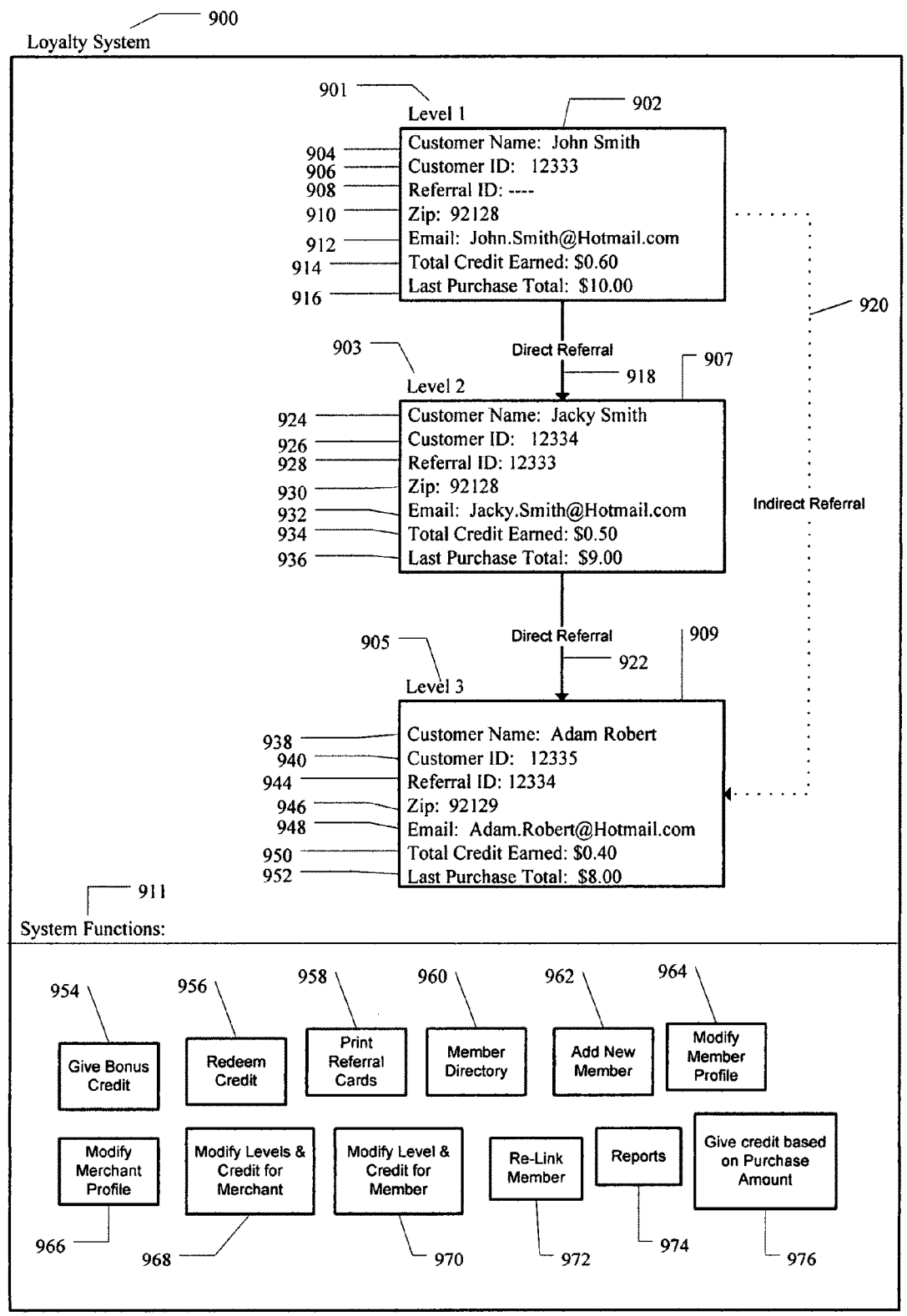
FIG. 9 is a system diagram illustrating an exemplary embodiment according to this invention.

An exemplary embodiment of the customer loyalty system is described in FIG. 9. The diagram illustrates the loyalty system 900 and the system functions 911. The loyalty system 900 stores customer profiles, credit data, and referral network data. FIG. 9 illustrates an exemplary three level loyalty system. The system is able to support levels ranging from 1 to an infinite number of levels, depending on the memory available to the system to store data. The first profile 902 is associated with a "level 1" 901 due to a null value associated with the referral ID 908. The first profile 902 has a customer name 904 of John Smith, a customer ID 906 of 12333, a zip 910 of 92128, an email 912 of John.Smith@Hotmail.com, a credit earned 914 of $0.60, a last purchase total 916 of $10.00. The customer ID 906 is a unique identifier that may be a number, or an alpha-numeric phrase. The customer name 904 may be the first name followed by the last name of the customer. In general, the referral ID 908 is the customer ID of the person whom referred this particular customer into joining the customer loyalty system or may be null if the customer was not referred and joined the loyalty system without the influence of an existing customer. The zip 910 is the zip code associated with the residence of the customer, in order to capture the geographical location of the customer and provide the data to the business for further analysis for advertising/marking campaigns. The email 912 is the electronic mail contact information associated with the customer that a business may use to reach existing customers. The total credit earned 914 is the total amount of credit earned by purchase made by the actual customer and also the amount earned by purchases made by the customer's direct and indirect referrals. The credit is a percentage of the total purchase that is added to the customer total credit earned, for example, if a customer earns a 5% credit on every eligible purchase, a total purchase of $1.00 may adjust the total credit earned by 5 cents. The last purchase total 916 is the total amount of the last purchase made by the actual customer.

The second profile 907 is a direct referral 918 of the first profile 902. The second profile 907 is associated with a "level 2" 903 status due to a direct referral relationship with a customer profile having a null referral ID. The second profile 907 has a customer name 924 of Jacky Smith, a customer ID 926 of 12334, a referral ID 928 of 1233 equal to the customer ID 906 of the first profile 902, a zip 930 of 92128, an email 932 of Jacky.Smith@Hotmail.com, a total credit earned 934 of $0.50, a last purchase total 936 of $9.00. The referral ID 928 assigned 12333 of the second profile 907 links the second profile 907 with the first profile 902, therefore, making the second profile a direct referral of the first profile 902. Any eligible purchase made by the second profile 907 will adjust the total credit earned 914 of the first profile 902 as well as adjust the total credit earned 934 of the second profile 907.

The third profile 909 is a direct referral 922 of the second profile 907. The third profile 909 is associated with a "level 3" 905 status due to a direct referral relationship with the second profile 907 which in turn has a direct referral relationship with the first profile 902. The referral ID 944 of the third profile 909 is equal to the customer ID 926 of the second profile, therefore, establishing a direct referral relationship between the two separate profiles. The third profile 909 may also be referred to as having an indirect referral 920 relationship with the first profile 902. Any eligible purchases made by the third profile 909 will adjust the total credit earned 914 of the first profile 902, the total credit earned 934 of the second profile 907, and the total credit earned 950 of the third profile 909. The third profile 909 has a customer name 938 of Adam Robert, a customer ID 940 of 12335, a referral ID 944 of 12334, a zip 946 of 92129, an email 948 of Adam.Robert@Hotmail.com, a total credit earned 950 of $0.40, a last purchase total 952 of $8.00. The referral ID 944 of 12335 links the third profile 909 with the second profile 907, therefore making the third profile an indirect referral 920 of the first profile 902. Any eligible purchase made by the third profile 909 will earn credit not only for the third profile 909, but also earn credit for the second profile 907 and the first profile 902. In example, if the system profile is set up to accept 4% for "level 1", 3% for "level 2", and 1% for "level 3" then an eligible purchase total of $8.00 made by the third profile 909 would earn the third profile 909 4% or 32 cents, the second profile 907 3% or 24 cents, the first profile 902 1% or 8 cents. Moreover, consistent with the previous example, an eligible purchase total of $9.00 made by the second profile 907 would earn the second profile 907 4% or 36 cents and the first profile 902 3% of 27 cents. Finally, also consistent with the previous stated system profile, an eligible purchase total of $10.00 made by the first profile 902 would earn the first profile 902 4% or 40 cents. Also, according to the diagram, the referral network (not shown) of the first profile 902 consists of the first profile 902, the second profile 907, and the third profile 909. Wherein, the referral network (not shown) of the second profile consists of the second profile 907 and the third profile 909. Lastly, the referral network (not shown) of the third profile consists only of the third profile 909.

The loyalty system 900 is comprised of a plurality of system functions 911. Any exemplary embodiment of the system comprises the following system functions 911; give bonus credit 954, redeem credit 956, print referral cards 958, member directory 960, add new member 962, modify member profile 964, modify merchant profile 966, modify levels & credit for merchant 968, modify level & credit for member 970, re-link member 972, reports 974, give credit based on purchase amount 976. Give bonus credit 954 in the loyalty system is designed to allow the system attendant the ability to assign an individual profile additional credit to be added to the total credit earned value, increasing the overall credit value of a specific member profile. Redeem credit 956 in the loyalty system is designed to allow the system attendant the ability to subtract from an individual profile a specific amount from the total credit earned available on in the individual profile when a customer redeems the specific amount of credit towards a purchase made. Print referral cards 958 in the loyalty system is designed to allow the system attendant the ability to print referral cards for individual profiles in real-time as demanded by the customer. These referral cards are given to the existing loyalty system customer to use to refer new client to the business. Member directory 960 in the loyalty system is design provide the system attendant the ability to query or search the database for existing customer profiles, previously added to the loyalty system. Add new member 962 in the loyalty system is designed to capture detailed customer information used to identify a customer in the loyalty system and also capture referral information to link a profile to an existing customer, if applicable. Modify member profile 964 in the loyalty system is designed to capture edits or modification to the existing customer profiles in the loyalty system. Modify merchant profile 966 in the loyalty system is designed to allow an administrative user the ability to modify the business contact information stored in the loyalty system. Modify levels & credit for merchant 968 in the loyalty system is designed to allow the administrative user the ability to modify the default setting of levels and credits as set by the loyalty system to suit the business model favored by the business, wherein these modifications may be made on multiple occurrences to suite the needs of the business owner. Modify levels & credit for member 970 in the loyalty system is designed to allow the administrative user the ability to modify the merchant setting of levels and credit applied to every customer profile, to be re-set or customized for specific customers to best suite the needs of the business owner. Re-link member 972 in the loyalty system is designed to allow the administrative user the ability to re-link existing customers with a different existing customer, where an error is made or a customer requests the re-linking to be executed. Reports 974 in the loyalty system are designed for the administrative user to generate business reports in regards to customer profiles, customer purchases, customer credits, and administrative reports to manage loyalty system attendant use. In the occurrence that a loyalty system is not in communication with a point of sale system, wherein purchase data needs to be inputted by an attendant, the function of give credit based on purchase amount 976 will allow system attendants the ability to input the total purchase amount and calculate the amount of credit earned by the customer and associate the credit with the customer profile stored in the system.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A system, comprising:
   A client application that is
   in communication with a merchant point of sale system to permit a plurality of customer user profiles to be linked with a plurality of purchase transaction derived by the merchant point of sale system;
   allows a merchant user to assign and transmit an incentive value for transactions made by the actual customer, a direct incentive value for transactions made by a direct referral of the actual customer, and at least one indirect incentive value for transactions made by an indirect referral of the actual customer to a server application;
   permits the merchant user to re-configure and re-transmit the incentive value, the direct incentive value and the at least one indirect incentive value to the server application;
   permits the merchant user to request for and redeem any portion of a total credit earned accumulated for each of the plurality of customer user profiles,
   wherein the total credit earned is a total amount of credit earned by purchase made by the actual customer and also the amount of credit earned by purchases made by the customer's direct and indirect referrals.

2. The system of claim 1, wherein the client application enables the capture and transmission of the plurality of customer user profiles to the server application.

3. The system of claim 1, wherein the client application provides for the ability to give bonus credit.

4. The system of claim 1, wherein the client application provides for the ability to print referral cards.

5. The system of claim 1, wherein the client application permits at least one customer user profile to be re-linked to a new parent referral causing an optional re-calculation of the total credit earned by the actual customer if the new parent referral has a different incentive value assigned to at least one of the following, the incentive value, the direct incentive value, or the indirect incentive value.

6. The system of claim 1, wherein the client application permits the merchant user to generate and print reports about the plurality of stored customer user profiles.

7. The system of claim 1, wherein the incentive value is discount amount for a purchase.

8. A computer-implemented method, comprising:
   Supporting at least one merchant user;
   permitting the configuration and modification of a plurality of customer user profiles, an incentive value, a direct incentive value, and at least one indirect incentive value as configured by the at least one merchant user,
   wherein the incentive value is associated with a plurality of purchase transactions completed by an actual customer, the direct incentive value is associated with a plurality of direct referral transactions of the actual customer and the at least one indirect incentive value is associated with a plurality of indirect referral transactions of the actual customer;
   computing a total credit earned for the plurality of user profiles,
   wherein the total credit earned is derived from the plurality of transactions completed by the actual customer as associated with corresponding incentive value, the direct referral transactions as associated with corresponding direct incentive value, and the at least one indirect referral transactions as associated with corresponding indirect incentive value;

retrieving the total credit earned as requested by the at least one merchant user for the plurality of customer user profiles; and re-computing the total credit earned when the at least one merchant user redeems any portion of the total credit earned.

9. The computer-implemented method of claim 8, wherein the incentive value is a discount amount.

10. The computer-implemented method of claim 8, wherein the direct incentive value is a discount amount.

11. The computer-implemented method of claim 8, wherein the at least one indirect incentive value is a discount amount.

12. The computer-implemented method of claim 8, wherein the total credit earned is a discount amount.

13. The computer-implemented method of claim 8, wherein the plurality of customer profiles comprise a username and an email address.

14. The computer-implemented method of claim 8, wherein the plurality of user profiles comprise a unique customer identifier.

15. A multi-merchant system, comprising:

A first merchant thin client application that is
in communication with a first merchant point of sale system;
permits a first merchant user to configure and transmit an incentive value for purchase transactions made by an actual customer by the first merchant point of sale system, a direct incentive value for transaction made by a direct referral of the actual customer by the first merchant point of sale system, and at least one indirect incentive value for transactions made by an indirect referral of the actual customer by the first merchant point of sale system to a server application;
permits the first merchant user to re-configure and re-transmit the incentive value, the direct incentive value and the at least one indirect incentive value as previously configured by the first merchant user to the server application;

A second merchant thin client application that is
in communication with a second merchant point of sale system;
permits a second merchant user to configure and transmit an incentive value for purchase transactions made by the actual customer by the second merchant point of sale system, a direct incentive value for transaction made by a direct referral of the actual customer by the second merchant point of sale system, and at least one indirect incentive value for transactions made by an indirect referral of the actual customer by the second merchant point of sale system to a server application;
permits the second merchant user to re-configure and re-transmit the incentive value, the direct incentive value and the at least one indirect incentive value as previously configured by the second merchant user to the server application;

A server application, that is
in communication with the first merchant thin client application and the second merchant thin client application;
permits for storage and the modification of the plurality of user profiles, the incentive value, the direct incentive value, and the indirect incentive value for the first merchant user and the second merchant user;
provides for computation and retrieval of a total credit earned,
wherein the total credit earned is a total amount of credit earned by purchases made by the actual customer and purchases made by the customer's direct and indirect referrals completed by the first merchant user and the second merchant user; and
re-computes the total credit earned if the first merchant user or the second merchant user redeems any portion of the total credit earned.

16. The multi-merchant system of claim 15, wherein the first merchant and the second merchant have access to a customer resource management system with access to a plurality of user profiles.

17. The multi-merchant system of claim 15, wherein the incentive value is a cash discount.

18. The multi-merchant system of claim 15, wherein the direct incentive value is a rebate.

19. The multi-merchant system of claim 15, wherein the at least one indirect incentive value is a discount amount.

20. The multi-merchant system of claim 15, wherein the first merchant thin client application providing for ability to print customer referral cards.

21. The multi-merchant system of claim 15, wherein the second merchant thin client application providing for the ability to give bonus credit.

* * * * *